Aug. 18, 1925.  
T. E. TAYLOR.  
ARMY FIELD KITCHEN  
Filed April 18, 1922  
1,550,638  
5 Sheets-Sheet 4

Inventor  
Thomas E. Taylor  
By Chas E. Billman  
Attorney

Aug. 18, 1925. 1,550,638

T. E. TAYLOR

ARMY FIELD KITCHEN

Filed April 18, 1922   5 Sheets-Sheet 5

Inventor
Thomas E. Taylor
By his Attorney

Patented Aug. 18, 1925.

1,550,638

UNITED STATES PATENT OFFICE.

THOMAS E. TAYLOR, OF MANSFIELD, OHIO, ASSIGNOR TO THE TAPPAN STOVE COMPANY, OF MANSFIELD, OHIO, A CORPORATION OF OHIO.

ARMY FIELD KITCHEN.

Application filed April 18, 1922. Serial No. 555,182.

*To all whom it may concern:*

Be it known that I, THOMAS E. TAYLOR, a citizen of the United States, residing at Mansfield, in the county of Richland and State of Ohio, have invented certain new and useful Improvements in Army Field Kitchens, of which the following is a specification.

My invention relates to improvements in portable cooking apparatus, and more particularly to that class or type commonly known as "army field kitchens", and as "rolling kitchens", being particularly designed and adapted for use in the preparation of food for troops on a march or in the field.

The improved kitchen is arranged and designed so as to be entirely self-contained upon a single vehicle chassis, the vehicle or kitchen unit being provided with suitable storage spaces for the supplies of water, fuel and food required so that the cooking operations may be proceeded with during the travel of the vehicle or kitchen unit.

The primary object of the invention is to provide a generally improved field kitchen of the class indicated, particularly designed and adapted to meet the varying requirements of army or field service, as well as one which is simple in construction and efficient in use. The cooking apparatus may be fired by coal or wood, or liquid fuel, and in the latter instance a suitable liquid fuel tank is provided and conveniently arranged on the vehicle chassis adapted to be connected to a suitable burner which may be readily inserted in the fire box or combustion chamber when desired.

A further and very important object is the provision of an improved construction and arrangement of fire box and oven and cooking sections embodying an improved arrangement of flues and ports for the products of combustion whereby to provide a maximum amount of heat with a minimum consumption of fuel.

A still further object is the provision of a vehicle chassis, including running boards and firing and cooking platforms, together with central fire box and oven sections extending longitudinally between said platforms and having cooking pot receiving cooking sections at the sides adjacent to said running boards, said oven section being superposed above said fire box section and between said cooking sections and having end doors opening on either of said platforms whereby bake pans, and the like, may be readily inserted or removed from either of said platforms.

A still further object is the provision of improved conveniently arranged kitchen and food storage cabinets or receptacles with ample and conveniently arranged work space, tables, shelves, etc.

A still further object is the provision of an improved form of cooking pots, so constructed and arranged as to be easily cleaned and kept sanitary, together with improved means for mounting and clamping the cooking pots in the cooking sections and improved lids and dust excluding covers for such pots or receptacles.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification.

Similar numerals of reference designate like parts throughout all the figures of the drawings.

The vehicle chassis may be of any suitable and convenient form, including the running gear and the springs, the latter, in the present instance, being omitted for the purpose of clearness of illustration.

In the present instance, the vehicle chassis is made up of longitudinally extending side members 1, connected by means of cross bars 1$^a$, the latter, in the present instance, being in the specific form of angle bars. The cross bars 1$^a$ serve to strengthen the chassis frame as a whole and to support the various running boards and platforms, units and receptacles for the portable or field kitchen as a whole.

As a means of providing a suitable rear or firing platform 2, the rear ends of the side chassis bars 1 are provided with depending hangers or yoke members 1$^b$, and as a means of supporting the intermediate or cooking platform 3, and particularly the extended sides thereof, the intermediate cross bars 1$^a$ are extended at the sides, the projecting ends of the adjacent cross bars 1$^c$, being adapted to receive and carry on opposite sides of the vehicle chassis suitable tool and fuel supply boxes 4 and 5, respectively.

The hinged lids or covers 4$^a$ and 5$^a$, of the boxes 4 and 5, respectively, extend flush with and form continuations of the front running boards 6$^a$, and it will also be observed that the front boards 6$^a$ and covers 4$^a$ and 5$^a$ extend substantially in the same horizontal plane with the main or rear running boards 6. The main running boards 6 terminate at their rear above step members 6$^b$, braced, in the present instance, by means of the brace members 6$^c$.

In the present instance, the vehicle chassis is provided with inner and outer top supporting columns or bars 7 and 7$^a$, respectively, terminating at their top in cross bows or members 7$^b$, and longitudinally extending members 7$^c$, the parts 7 to 7$^c$ forming a framework to receive and carry suitable top and side curtain material, such as canvass or the like.

Figure 7:
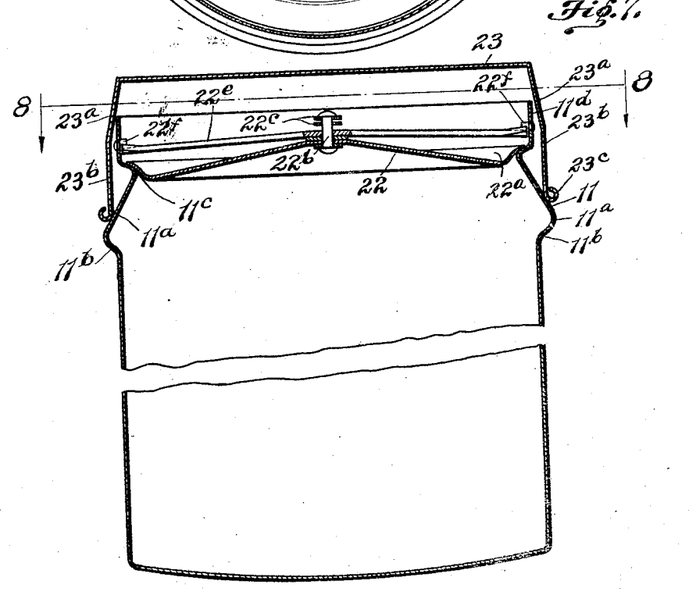
Fig. 7, an enlarged central vertical sectional view of one of the covered cooking vessels used in the side cooking sections of the improved field kitchen.

Referring now to the improved heating, cooking and baking unit, it will be seen that the same is mounted upon the rear end of the vehicle chassis between the firing and cooking platforms 2 and 3 and the rear running boards 6. The improved unit comprises a central fire box or heating section 8, extending longitudinally between the platforms 2 and 3 and forming a combustion chamber 8$^a$, as shown most clearly in Figs. 7, 8, and 9 of the drawings.

Figures 4, 5, 6:
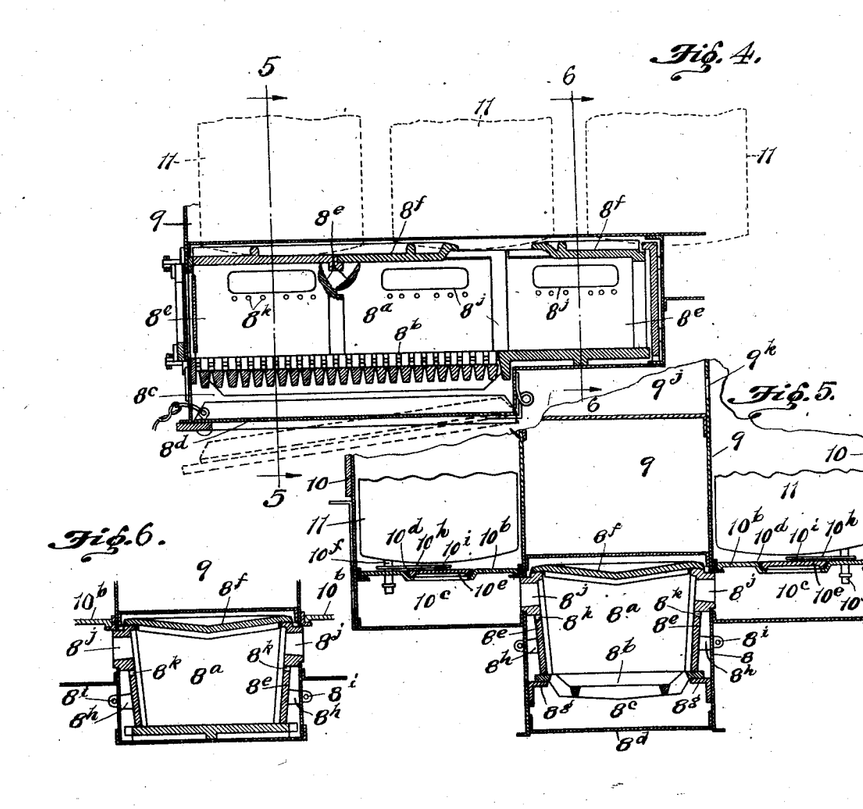
Fig. 4, a detailed central vertical sectional view of the centrally arranged combustion chamber, fire box and grating, the dotted lines illustrating the relative arrangement of the cooking pots or vessels at the sides and over the communicating flues in the side heating sections.
Fig. 5, a transverse vertical cross sectional view of the combustion chamber and oven and the pot receiving heating side sections, taken on line 5—5 of Fig. 4, and illustrating more particularly the relative arrangement of the pots or cooking vessels and the pot or vessel heating flues leading from the central combustion chamber.
Fig. 6, a transverse vertical sectional view of the front portion of the centrally arranged fire box, taken on line 6—6 of Fig. 4.

The combustion chamber 8$^a$ is provided with a suitable grating 8$^b$, an ash pit section 8$^c$, being provided below and the section 8$^c$ being provided with a hingedly connected ash pan 8$^d$, which may be readily dropped down to the dotted line position shown in Fig. 4 to discharge the ashes and other refuse products of combustion rearwardly upon the ground. The central fire box section 8 is provided with fire box side lining sections 8$^e$, and overhanging or horizontal lining sections 8$^f$. The grating section 8$^b$ may be mounted on the ledge or bracket members 8$^g$, of the outer walls of the fire box section 8, as shown most clearly in Fig. 5 of the drawings, and the side lining sections 8$^e$ may be provided with projecting arms 8$^h$, extending through suitable slots in the side walls 8 and being adapted to be secured therein by means of suitable attaching elements such as cotter pins or the like in the eyes or openings 8$^i$.

The side lining sections 8$^e$ are provided with elongated port openings 8$^j$, on either side adapted to conduct the products of combustion into the flues of the side cooking sections hereinafter referred to. The lining sections 8$^e$, in the present instance, are provided with relatively small ports 8$^k$, which communicate with the intervening space between the side walls of the central fire box 8 and the lining members or sections. Superposed above the fire box section 8 is a longitudinally extending oven section 9, extending longitudinally between the rear and front platforms 2 and 3 and provided with rear and front doors 9$^a$ and 9$^b$, respectively, opening from either end and above the respective platforms referred to. The arrangement of the ends and doors of the oven section provides the convenience of permitting the bake pans or other baking vessels to be inserted or removed from either of said platforms.

The doors are preferably mounted by means of externally arranged demountable hinge members 9$^c$ and 9$^d$, respectively, the rear door, however, swinging vertically and being adapted to be stopped and sustained in a horizontal position when open by means of the pivotally connected folding brace arms or links 9$^e$, connected to the brackets 9$^f$, of the rear door 9$^a$ and the rear wall of the baking and cooking unit. The rear vertically swinging door 9$^a$ may be secured by means of the transversely swinging latch 9$^g$, adapted when in a closed position to engage with the keeper plate 9$^h$.

The side cooking sections 10, are mounted on opposite sides of the oven section 9 and are provided with base portions 10$^a$ (see Fig. 5), and false bottoms 10$^b$, conjointly forming longitudinally extending flues 10$^c$, communicating with the port openings 8$^j$, and as a means of selectively opening and closing communication between the flues 10$^c$ and the pot or receptacle receiving portions of the cooking sections, the false bottoms 10$^b$ are provided with openings 10$^d$, normally closed by means of the plates 10$^e$. The plates 10$^e$ are adapted to be initially lifted from the openings 10$^e$ and then swung to one side by means of the vertically movable handle bars 10$^f$ (see Fig. 5), said vertical bars 10$^f$ leading upwardly and being provided with handles 10$^g$, at the sides of the cooking pots or receptacles and being provided at their lower ends with arms 10$^h$, extending over and being connected to central portions of the plates 10$^e$ by means of pivot bearing elements 10$^i$. The tops of the cooking sections 10 are provided with pot receiving openings 10$^j$, to removably receive and contain the cooking pots or receptacles 11. The oven section 9 is provided with a top 9$^i$, spaced above the top of the oven section 9, proper, and forming a horizontally extending flue 9$^j$, communicating with the cooking sections 10 by means of ports 9$^k$, as shown most clearly in Fig. 5 of the drawings.

As a means of improving the construction and mounting of the cooking vessels 11, and particularly as a means of providing a smoke-tight joint between the cooking pots and the openings 10$^j$, each cooking pot is provided with an outwardly extending enlarged portion or beading 11$^a$, affording a pot sustaining shoulder 11$^b$, adapted to suspend the pot or vessel 11 within the heating flues of the cooking sections 10, and also resting on the adjacent marginal edges of the openings serving to close or seal such openings as against the escape of smoke and other products of combustion thereto.

Figure 2:
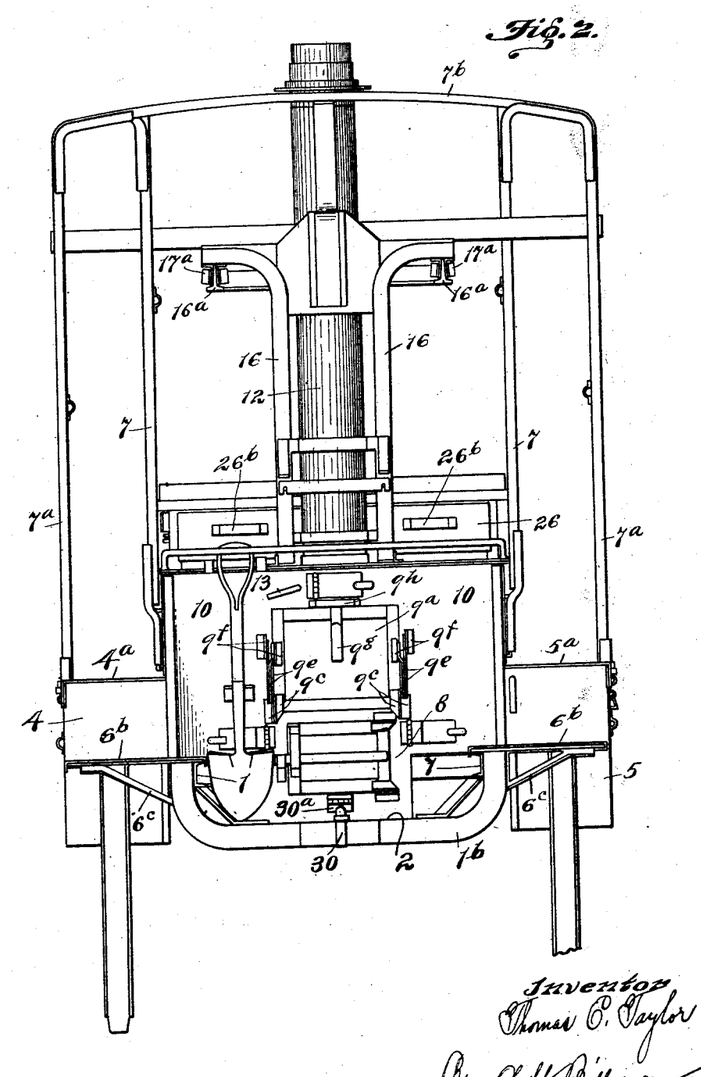
Fig. 2, a rear elevation of the same.
Figure 3:
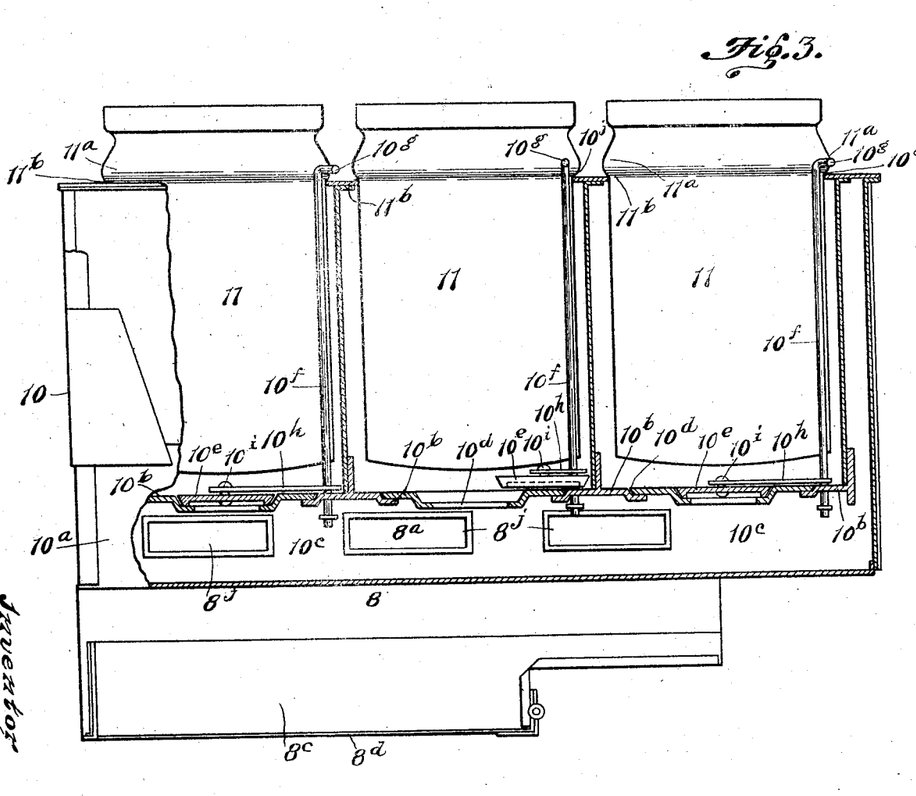
Fig. 3, an enlarged side elevation, partly in vertical longitudinal section, of one of the cooking box receiving and heating sections and illustrating more particularly the arrangement of the flue and inlet ports from the fire box and combustion chamber.

The products of combustion carried through the various ports and flues above described are finally permitted to escape from the oven flue 9$^j$ into the pipe or chimney 12, and the draft of the kitchen stove or unit may be readily controlled through suitable dampers operatively connected to the damper rod 13 (see Fig. 2).

Figure 1:
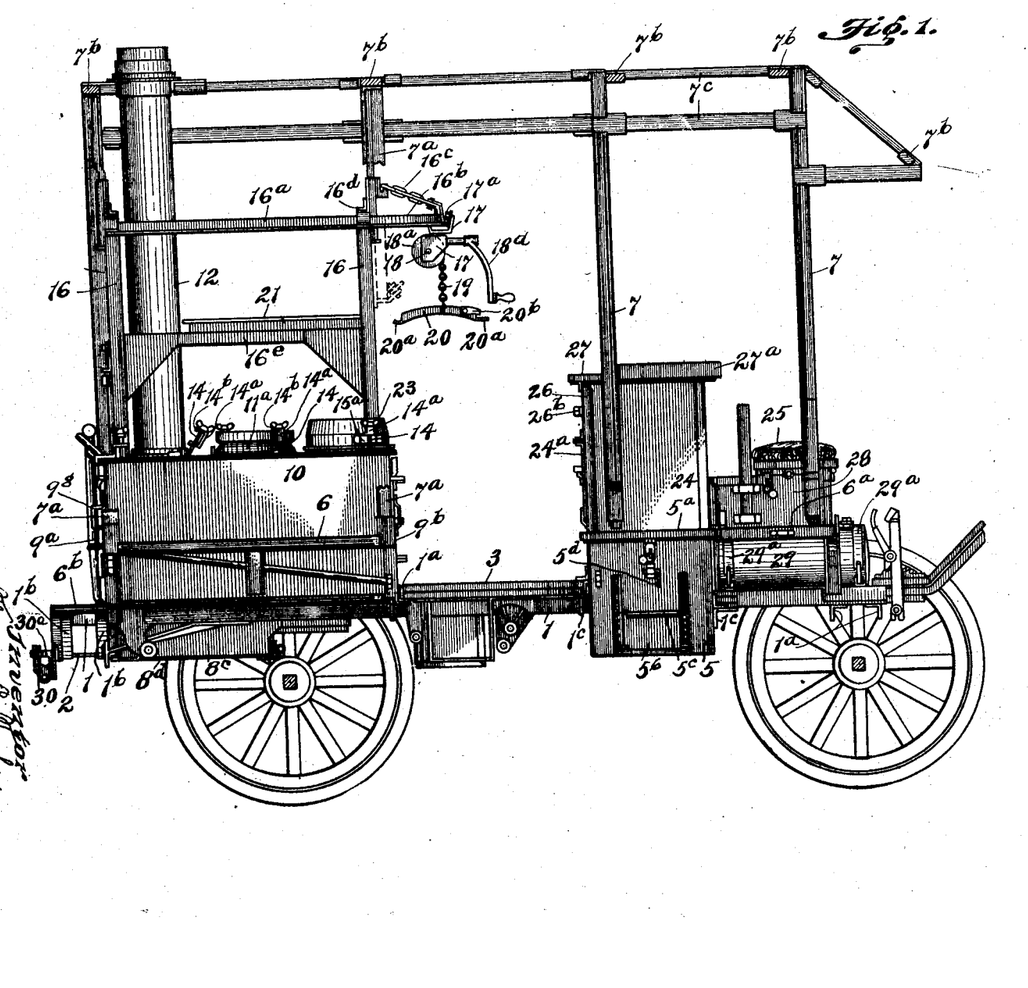
Figure 1 is a side elevation of an army field kitchen constructed in accordance with this invention, the top cover canvass being removed for the purpose of clearer illustration of the parts.

The upper edges of the cooking pots or receptacles 11 are adapted to be engaged and held down when in position by means of swinging clamp bolts 14, attached to the top of the baking and cooking unit, said clamp bolts 14 being provided with slidably mounted blocks 14$^a$, having jaws 14$^b$, adapted to engage with the edges of the cooking receptacles when the dust excluding covers are removed, or to engage with the handles 15$^a$, of the dust excluding covers 15, when the latter are in position, as shown in Fig. 1 of the drawings.

As a convenient means of handling the cooking pots, the central top portion of the kitchen stove unit may be provided with upwardly extending posts 16, terminating at their sides in track ways 16$^a$, said tracks 16$^a$ being adapted to be connected by means of a curved track section 16$^b$, adapted to swing upwardly over the cook's space or platform 3. When in use the segmental track section 16$^b$ may be moved upwardly and held in its horizontal position by means of a sustaining chain 16$^c$, adapted to hook over a hook 16$^d$, at the front of the track sustaining pedestal and when not in use being adapted to unhook and to swing downwardly to the dotted line position shown in Fig. 1 of the drawings. The track sections are provided with a carriage 17, having sustaining wheels 17$^a$, said carriage 17 being provided with a rotary shaft 18, carrying a chain winding drum 18$^a$, the drum being adapted to be driven by means of a worm wheel 18$^b$, connecting with a worm, driven by means of a handle 18$^d$. The chain 19 is adapted to carry a cross bar 20, having projections 20$^a$, adapted to engage with the rim portions of the cooking pots when it is desired to elevate the same, the latch 20$^b$, being adapted to centralize the cross bar and hold the same in proper relative position when attached to the cooking pots or receptacles. The intermediate portions of the uprights 16 may be provided with horizontal members 16$^e$, to receive and contain a cook's cook pan 21, or form a convenient support or shelf for cooking utensils, or the like, as shown most clearly in Figs. 1 and 2 of the drawings.

As a means of closing the cooking pots or receptacles an improved lid 22 is provided, (see Figs. 7 and 8) the lid 22 being upwardly dished at its central or main body portion and terminating at its outer edges in an upwardly and outwardly inclined annular flange 22$^a$, adapted to engage with an inner lid supporting shoulder 11$^c$, within the cooking pot formed at the base of the rim portion 11$^d$.

Figure 8:
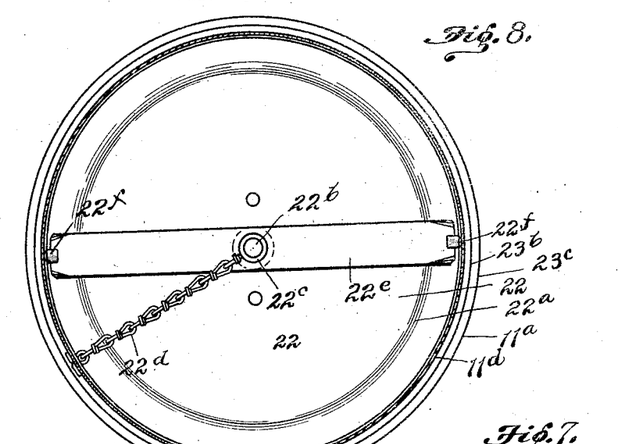
Fig. 8, a top plan view of the same, partly in horizontal section, taken on line 8—8 of Fig. 7.

As a means of attaching the lid 22 to the pot or receptacle 11 the central portion of the lid is provided with a bearing pin 22$^b$, the pin or attaching element 22$^b$ being provided with an attaching clip 22$^c$, provided with a chain 22$^d$, connected to the rim portion 11$^d$ of the receptacle 11, as shown most clearly in Fig. 8 of the drawings. As a means of sealing and clamping the lid upon the lid supporting shoulder 11$^c$ the bearing element 22 is provided with a spring cross bar 22$^e$, the outer ends of said clamp or bar 22$^e$ being adapted to be moved beneath and to engage with the stud bolts or members 22$^f$, formed in the rim 11$^d$ of the pot or receptacle 11.

As a means of further covering the cooking pots 11 and particularly as a means of excluding dust and other impurities from the tops of the lids 22, dust covers 23, may be provided, said covers being substantially of the form shown in Fig. 11 and being provided with tapered sides 23$^a$, terminating in relatively straight sides 23ᵇ, the sides or ends 23ᵇ terminating in beadings 23ᶜ. The beadings 23ᶜ fit down over the tapered portion of the enlarged annular portion 11ᵃ of the receptacle and the covers are preferably provided with handles 15ᵃ (see Fig. 1), so that the covers may be held down and clamped by means of the blocks 14ᵃ of the clamping bolts 14, as indicated in Fig. 1 of the drawings. The covers 23 when reversed form admirable frying and cooking vessels for various articles such as potatoes, doughnuts, etc.

As a means of providing a conveniently located cabinet to carry the various rations in proper proximity to the cook's work space or platform 3, a storage box or bin 24, is provided immediately in front of the platform 3 and at the rear of the hingedly mounted driver's seat 25, at the front. The storage cabinet or receptacle 24 is provided near its top with a hinged door 24ᵃ, adapted to be opened and swung downwardly and being provided at its sides with latches.

As a means of providing a suitably arranged receptacle for the various cooking utensils, the top of the cabinet is provided with a kit drawer 26, slidably mounted and provided with stop members 26ᵃ, the drawer being provided with suitable handles 26ᵇ.

Above the kit drawer 26 is a cook's table 27, provided about its sides and front with upwardly extending ledge members 27ᵃ.

As a means of providing a suitable storage receptacle for meat and the like, a meat box 28, is arranged in front of the storage box 24 and beneath the driver's seat 25, the latter operating as a door or cover and being adapted to be tilted forwardly affording access to the interior of the box 28. The box 28 is preferably made up of heavy steel walls lined with wood filler members the latter being provided with an inner-lining of zinc or other suitable lining material.

A liquid fuel supply tank 29 is centrally located beneath the meat box 28 and may be secured to the vehicle chassis by means of clamp straps 29ᵃ. The liquid fuel supply tank 29 may be provided with any suitable and convenient liquid valve and feed pipe (not shown) such feed pipe leading along the vehicle chassis and being adapted to be connected to the liquid fuel burner when the latter is used in the fire box or combustion chamber in lieu of solid fuel.

The fuel supply box 5 may be provided at its side with a vertically movable door 5ᵇ, and if desired the door 5ᵇ may be provided at its top with a flange 5ᶜ, so that when the door is elevated to the position shown in Fig. 1 of the drawings it may be held in such engaged position by means of the pivoted hook 5ᵈ, carried on the outer side of the box 5.

The front of the vehicle may be provided with any suitable and convenient removably mounted draft pole or bar and the rear end of the vehicle is preferably provided with a pintle eye hook 30, closed, in the present instance by means of a latch or hook closure member 30ᵃ, said hook 30 being of particular use in connecting to a trailing kitchen, or a number of such kitchens, or other vehicles, and also forming a convenient hitch in the event the vehicle should become stalled or get into a hole and it is desired to draw the same out.

The high shelf made up of the bars 16ᵉ is also admirably adapted to receive and carry a plurality of nested bake pans or receptacles for the oven, and, if desired, the track supporting posts 16 and the various track sections and pot lifting device above the high shelf 16ᵉ may be dispensed with.

It will be seen that I have provided an improved army field kitchen in which the oven section 9 is centrally located directly over the centrally located fire box and combustion chamber and that the latter is located between the side cooking sections 10, it being found that a fire box section in a kitchen of this class when out in the open and exposed, for example, to zero weather, with large surfaces exposed will not give results on account of the heat being absorbed too rapidly. In the present structure the oven is directly over the fire to get direct radiation rather than depending upon flame travel for such heat. This arrangement gives a satisfactory oven under all conditions of weather and fuel.

It will be seen also that the cooking pot receiving and carrying cooking sections 10 are placed on the sides and are not directly over the fire. This is done to protect the fire from the dripping of condensation of the products of combustion on the cold cook pots or receptacles. In winter the water is much colder and when a cook pot is placed over the fire the condensations drip down on the fire. Furthermore, if the pots are placed over the fire they will boil too rapidly and the food will either stick or scorch so that it will be necessary to remove from the fire. In the present construction during cold or zero weather with a little care in regard to the fire the cook pots may be left in the cooking sections without danger of burning the food and at the same time keeping the food the proper temperature for serving.

Having thus described one of the embodiments of my invention, without having attemped to set forth all the forms in which it may be made, or the modes of its use, what I claim and desire to secure by Letters Patent, is,—

1. In an army field kitchen, a chassis including running boards and firing and cooking platforms, and fire box and oven sections between the latter, said oven section being superposed above said fire box and having end doors opening on either of said platforms.

2. In a field kitchen, a side cooking section including a false bottom provided with port openings and forming a flue communicating with the combustion chamber, a plurality of cooking pots arranged above said port openings, and rotatable handle bars at the sides of said pots provided with lids whereby said port openings below said pots may be selectively open and closed.

3. In a field kitchen, including a combustion chamber, side cooking sections including pot receiving compartments and subjacent flues communicating with said combustion chamber, cooking pots in said compartments arranged above said subjacent flues, and vertical rotatable handle bars provided with valves whereby said pot receiving compartments may be selectively opened or closed.

4. In a field kitchen, a vehicle provided with intermediate and rear end platforms, a stove section between the latter including an oven section having end doors opening on either of said platforms whereby oven pans may be inserted or removed from the latter, and a cook's cabinet in front of said intermediate platform having ration and utensil receiving compartments accessible from said intermediate platform.

5. In a field kitchen, a vehicle provided with an intermediate cooking platform and a rear end firing platform, a stove section between said platforms including an oven section having doors opening on either of said platforms whereby oven pans may be inserted or removed from the latter, and a cook's cabinet in front of said cooking platform having ration receiving compartments accessible from said cook's platform.

6. In an army field kitchen, a chassis including running boards and firing and cooking platforms, and fire box and oven sections extending longitudinally between said platforms and arranged between said running boards, said oven section being superposed above said fire box section and having end doors opening on either of said platforms whereby bake pans may be inserted or removed from either of said platforms.

7. In an army field kitchen, a vehicle chassis including running boards and an intermediate platform and a rear end platform, fire box and oven sections extending between said platforms, said oven section being superposed above said fire box section and having end doors opening on either of said platforms, and side cooking sections having flues communicating with said fire box section and extending over said oven section.

8. In a field kitchen, a pot provided at its top with an enlarged beading forming an exterior pot sustaining and sealing shoulder below and an internal lid receiving shoulder above, a lid within said pot resting on said last mentioned shoulder, and a dust excluding cover having its edges seated on said shoulder when in its dust excluding pot covering position and having tapered sides fitting said pot opening when inverted thereby forming a frying pan.

9. In an army field kitchen, a vehicle chassis including running boards and an intermediate platform and a rear end platform, fire box and oven sections extending between said platforms, said oven section being superposed above said fire box section and having end doors opening on either of said platforms, and side cooking sections having flues communicating with said fire box section and provided with ports extending over said oven section.

10. In a field kitchen, a vehicle chassis including intermediate and rear end platforms, a fire box section and a superposed oven section extending between said platforms, side cooking sections having flues communicating with said fire box section, and a cook's cabinet forming a work table adjacent to said intermediate platform, said cabinet being provided with ration supply and kitchen utensil receptacles adapted to be opened and closed from said intermediate platform.

11. In an army field kitchen, a chassis including firing and cooking platforms, and fire box and oven sections extending longitudinally between said platforms, said oven section having top flues and ports and being superposed above said fire box section and opening on either of said platforms whereby bake pans may be inserted in or removed from either of said platforms, and cooking sections having pot receiving sections and ports adapted to be thrown into and out of communication with said fire box and said oven flues and ports.

12. In a field kitchen, central fire box and oven sections, the oven section being superposed above said fire box section and provided at its top with a flue, said flue being provided at its sides with ports, side cooking sections provided with false bottoms and partitions conjointly with said fire box and oven sections forming pot receiving compartments and subjacent flues provided with ports communicating with said fire box, and means for selectively directing the products of combustion through said pot receiving compartments and into said flue above said oven section.

13. In a field kitchen, a cooking section having a pot opening, a pot extending into said section and provided at its top with an enlarged beading forming a pot sustaining and sealing shoulder below and a dust cover sealing shoulder above, a dust excluding cover having its edges seated on said cover sealing shoulder when in one position and having tapered rim portions fitting said pot opening when inverted and forming a frying pan, and clamps connected to said cooking section adapted to interchangeable engage the tops of said pots or the handles of said covers when inserted.

14. In a field kitchen, in combination with a fire box and a superposed oven, side cooking sections provided with false bottoms and with subjacent flues communicating with said fire box, said side cooking sections being also provided with pot receiving compartments and openings, and said oven being provided with a superposed flue having side ports communicating with said compartments, ports in said false bottoms of said compartments, and closure plates provided with handles extending at the sides of said pots whereby said ports may be selectively opened and closed to selectively pass the products of combustion from said subjacent flues along said pots in said compartments and out of said side ports into said flue over said oven.

In testimony whereof I hereby affix my signature.

THOMAS E. TAYLOR.